UNITED STATES PATENT OFFICE.

FREDERICK W. ARMSTRONG, OF NEW YORK, N. Y.

COMPOSITION FOR RESTORING PAINTS.

SPECIFICATION forming part of Letters Patent No. 286,167, dated October 9, 1883.

Application filed June 27, 1883. (No specimens.)

*To all whom it may concern:*

Be it known that I, FREDERICK W. ARMSTRONG, of New York city, county of New York, and State of New York, have invented certain new and useful Improvements in Compounds for Restoring Paints, of which the following is a full, clear, and exact description.

The object of my invention is to produce a cheap, durable, efficient, and easily-applicable compound for the purpose of restoring, renovating, or freshening old paint, which, by exposure to the elements, especially at the seaside, (but likewise in other situations,) has become dry, chalky, discolored, and otherwise deteriorated, and thereby no longer capable of affording a sufficient or proper protection to the surface on which it is applied.

To accomplish this my invention consists in the production of a novel and useful compound, which will be herein first fully described, and then pointed out in the claim.

The compound consists of the following ingredients, which I prefer to unite in the proportions given: Four parts (by measure) of refined nut-oil, one part of sulphate of manganese, five parts of rape-seed oil, one part of nitrate of potassa, and one part of varnish. The relative proportions of these parts may be slightly modified without materially changing the compound. The mixture of these ingredients is subjected to the heat of a slow fire in a sand-bath or steam-jacketed kettle for two or more hours, care being taken not to burn the liquid. The resulting liquid is then filtered, and should be allowed to stand or cure for about thirty days, when it will be ready for use.

The restorer thus produced is to be applied upon the old painted surfaces with a brush in the ordinary way of painting or varnishing. It assimilates with the old and dry paint, restores its body, and dries with a hard glassy surface, bringing out the original color of the paint and producing a surface which will withstand the effects of the elements for a long time.

The advantages and various applications of the improved compound, possessing the qualities above enumerated, are obvious and need not be enlarged upon. The compound made and applied as above explained is found in practice to admirably answer the purpose of the invention, as previously set forth.

Having now fully described my improved compound, what I claim as new, and desire to secure by Letters Patent, is—

The herein-described compound, consisting of refined nut-oil, sulphate of manganese, rape-seed oil, nitrate of potassa, and varnish, united substantially in the manner and for the purposes set forth.

In testimony that I claim the foregoing I have hereunto set my hand in the presence of two witnesses.

F. W. ARMSTRONG.

Witnesses:
JOHN BUCKLEN,
WORTH OSGOOD.